Jan. 2, 1934.  E. DUHME  1,942,241
LIQUID LEVEL CONTROLLING MEANS
Filed Nov. 26, 1930   3 Sheets-Sheet 1
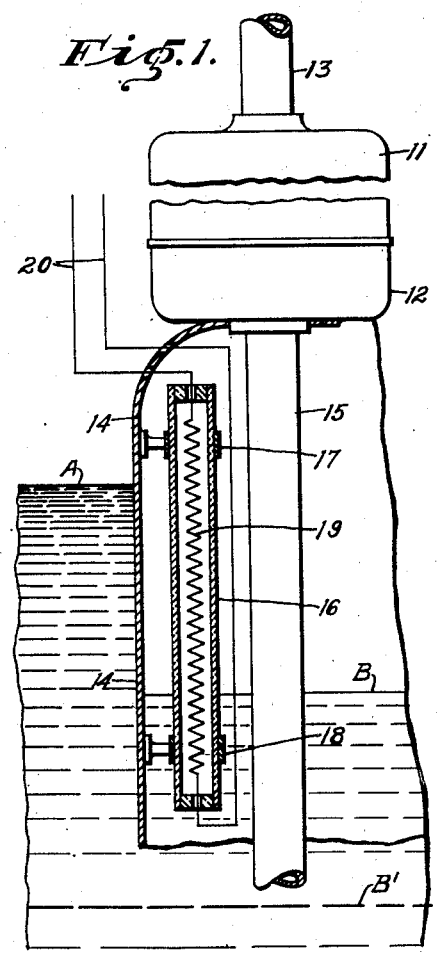
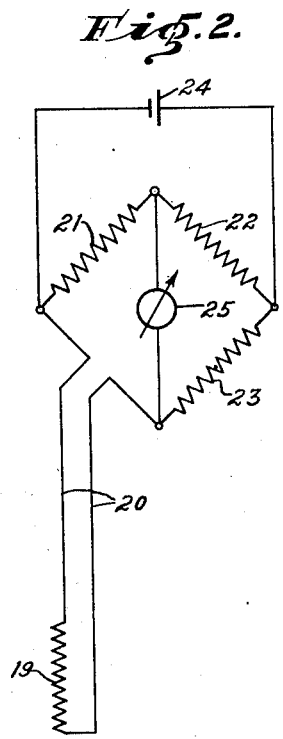
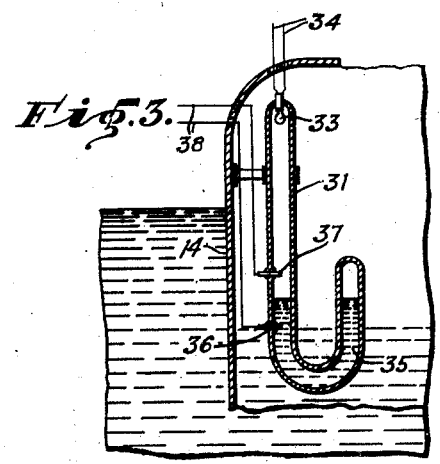
INVENTOR
*Emil Duhme*
BY
ATTORNEY Jan. 2, 1934.　　　　E. DUHME　　　　1,942,241
LIQUID LEVEL CONTROLLING MEANS
Filed Nov. 26, 1930　　　3 Sheets-Sheet 2
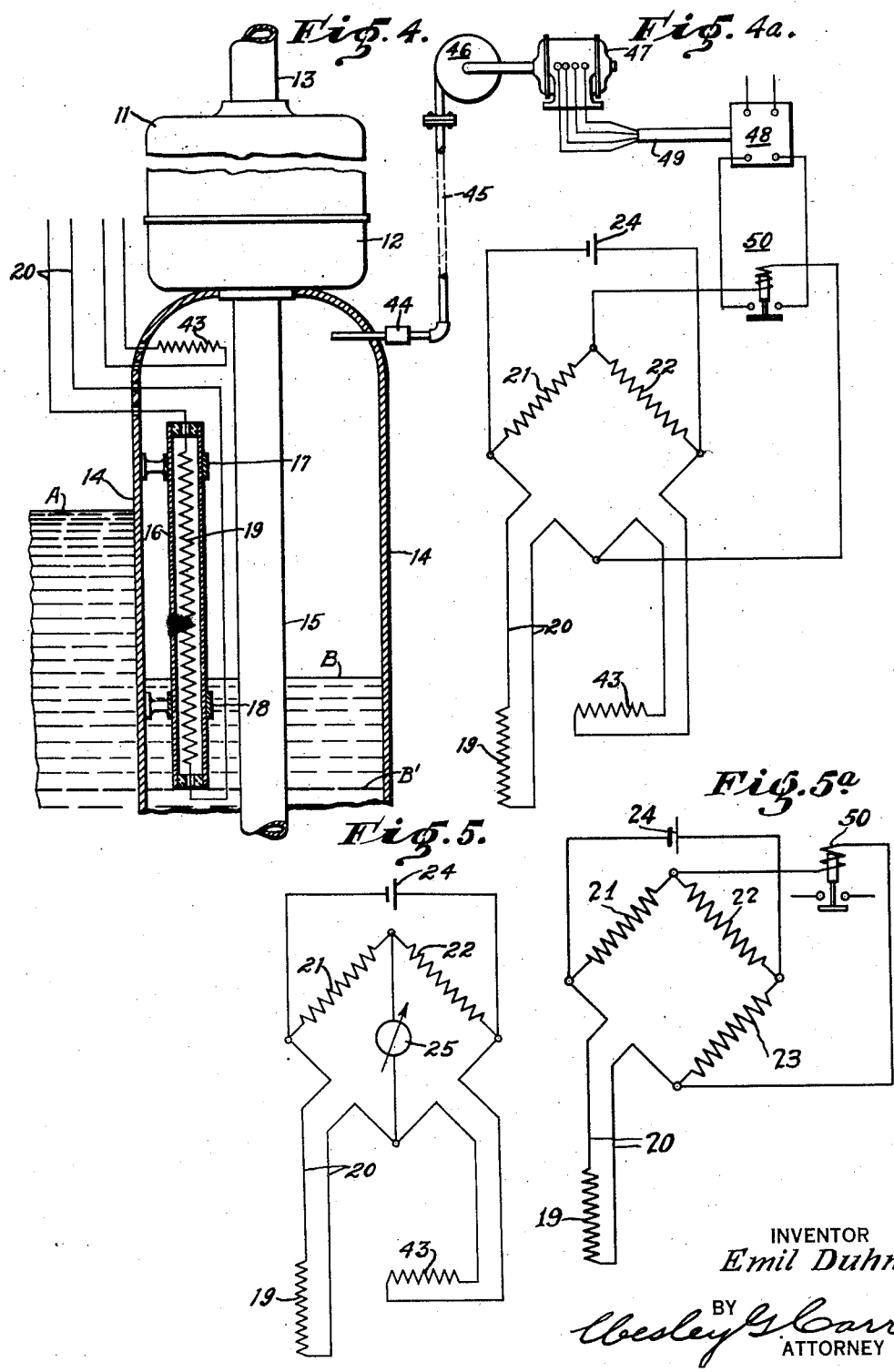
INVENTOR
*Emil Duhme*
BY
*Chesley G. Carr*
ATTORNEY

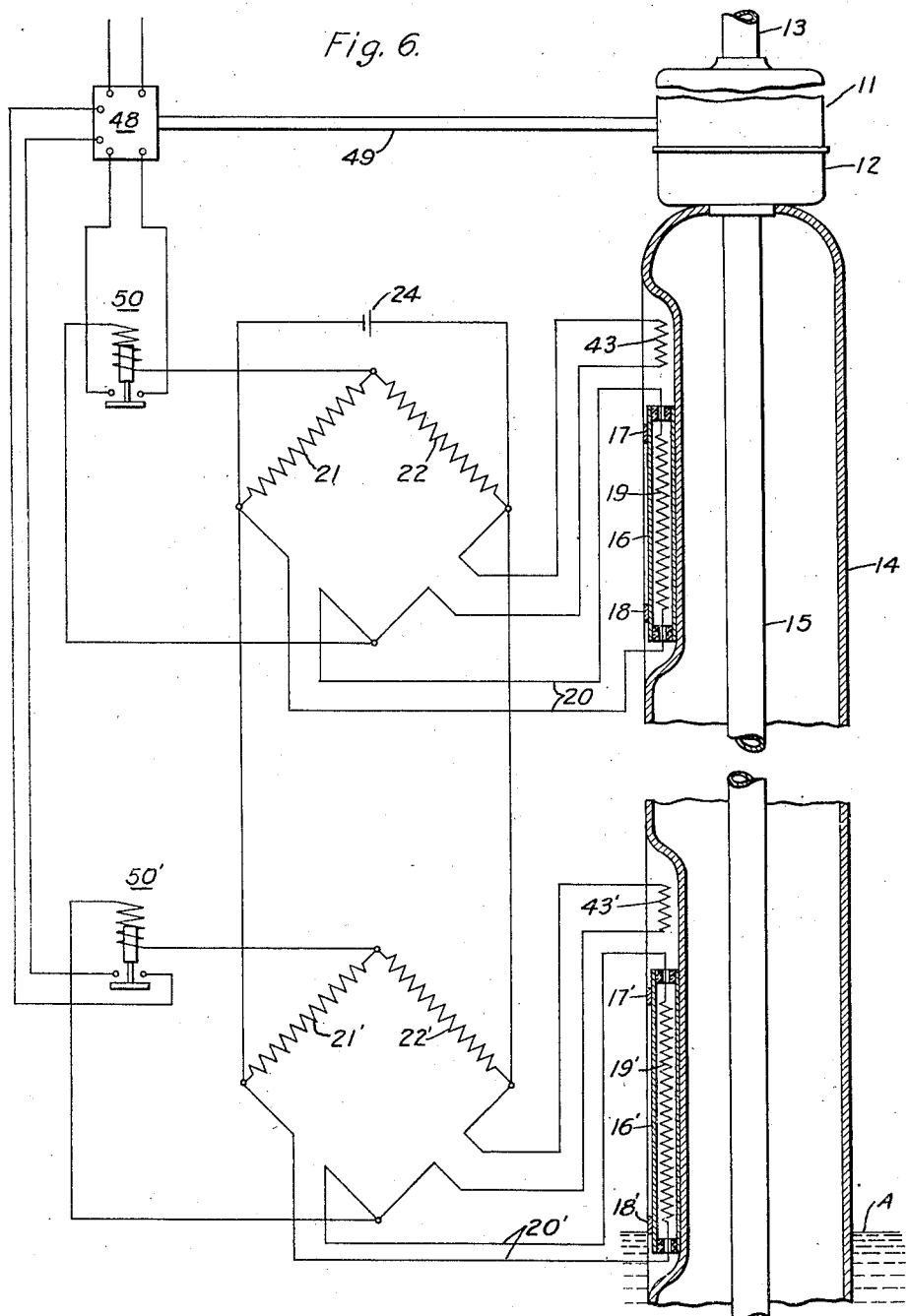

Patented Jan. 2, 1934

1,942,241

UNITED STATES PATENT OFFICE 1,942,241

LIQUID LEVEL CONTROLLING MEANS

Emil Duhme, Berlin-Siemensstadt, Germany, assignor to Westinghouse Electric & Manufacturing Company, a corporation of Pennsylvania Application November 26, 1930, Serial No. 498,502, and in Germany January 27, 1930

7 Claims. (Cl. 103—25)

This invention relates to safety devices for electrical equipment.

More particularly, this invention relates to devices designed to protect electric motors, or other electric devices when required to operate submerged in water, oil, or other liquids.

Electrically driven submersible pump-sets, or other devices are sometimes provided with a water tight casing. However, in the enclosed type of machine to prevent liquid from entering the working parts expensive packing glands or stuffing boxes are necessary at the shaft bearings. Such means to prevent liquid from entering the casing very frequently leak, with consequent damage to the working parts of the pump-set.

More frequently, electrically driven submersible pump-sets, or other submersible equipment, are provided with diving bells. When diving bells are utilized, the gas trapped in the bell gradually disappears, being dissolved by the liquid and also being lost through leaks that are practically unavoidable. In order to prevent an undesirable rise of the liquid in the diving bell, a float, for controlling electric contact members, is disposed in the diving bell to operate a signal or indicator. However experience teaches that float operated devices fail frequently because of the operating conditions, thus causing irrepairable damage to the electrical equipment in the diving bell. Furthermore, such float operated devices are responsive only to a single liquid level in the diving bell.

One of the objects of this invention is the provision of inexpensive, efficient and reliable electrically operated means for controlling the liquid level in a diving bell of submersible pump-sets.

Another object of this invention is to prevent the liquid level in a well, reservoir, or diving bell from rising above a predetermined level.

It is also an object of this invention to provide electrically controlled means for indicating the liquid level in a well, reservoir, or diving bell.

Other objects and advantages of this invention will become evident from the following description, taken in conjunction with the accompanying drawings, in which:

Figure 1 is a schematic view in side elevation of one modification of my invention;

Fig. 2 is a diagram showing the Wheatstone bridge arrangement used in conjunction with the modification shown in Fig. 1;

Fig. 3 is a sectional view showing a further modification of this invention applied to a diving bell;

Fig. 4 is a view partly in section and partly in side elevation showing my invention and how it may be connected with a control system such as shown in Fig. 4—a for controlling the liquid level in a diving bell;

Figs. 5 and 5a are diagrammatic showings of modifications of the Wheatstone bridge shown in Fig. 2; and Fig. 6 is a diagrammatic showing of a different application of the modification shown in Figs. 4 and 4a.

Referring more particularly to Fig. 1 of the drawings, 11 designates the electric motor of a submersible pump-set. The pump 12 is directly connected to the motor housing and a diving bell 14 is connected to the motor and pump housing by a fluid tight joint. The intake pipe 15 of the pump 12 extends through the top of the diving bell into the pump. The whole assembly may be suspended in the well by means of the pump discharge pipe 13.

A fluid tight receptacle or chamber 16 of quartz or some other material not harmfully influenced by changes in temperature is disposed longitudinally in the diving bell. The receptacle 16 is held in position by the brackets 17 and 18, and an electrically heated resistor 19 is mounted in the chamber 16, the resistor being electrically heated from a suitable source of electric power that may be provided in the pump house of the well, not shown. To materially increase the efficiency of operation of the electrically heated resistor in the diving bell, the chamber 16 may be filled with hydrogen, helium or some other gas having good heat conducting qualities.

When the submersible pump-set is lowered into the well, gas or air is trapped in the diving bell and the liquid is prevented from rising in the bell, i. e., the liquid will be held at the level indicated at B' Fig. 1 or some lower level, depending upon the depth of the liquid in the well at the pump-set. During the operation of the pump 12, the gas trapped above the liquid in the diving bell gradually diminishes and the liquid begins to rise to the level indicated at B. When the liquid surrounds the chamber 16 the heat dissipated from the resistor 19 will be materially increased, in consequence the electric resistor is changed.

Such change in resistance may be utilized to operate a signal or an indicator, to indicate to the attendant in the pump house that the liquid level in the diving bell has exceeded a safe operating level. The attendant may then, by appropriate means well known in the art, replenish the gas in the diving bell.

In Fig. 2 is shown a Wheatstone bridge arrangement which may be utilized with the resistor 19 preferably mounted in the chamber 16. A source of direct-current power 24 is connected to two opposite junction points of the Wheatstone bridge and a device 25, which may be an indicator, a signal or a conventional galvanometer, is connected to the other pair of opposite junction points of the Wheatstone bridge. Resistor elements 21, 22 and 23 are connected in three of the arms of the Wheatstone bridge and are so designed that the temperature changes adjacent these resistors will not materially effect the indicating means 25. The resistor 19 through conductors 20 is disposed in the fourth leg of the Wheatstone bridge and, since this resistor is disposed in the receptacle 16, it will be responsive to the changes in the liquid level in the diving bell. Since the receptacle 16 is disposed longitudinally of the diving bell, the unbalancing effects on the Wheatstone bridge caused by the variations of the liquid level in the diving bell will be proportional to such variations and may, therefore, be indicated by the instrument 25. It is, therefore, obvious that the attendant is not only informed that the liquid level in the diving bell has exceeded a safe operating level, but he is also informed to just what extent the liquid level has risen in the bell. Furthermore, for any given operating condition, the liquid level in the diving bell is a function of the liquid head at the pump set. The attendant will, therefore, also be informed when the well needs to be pumped.

A U-shaped receptacle having legs unequal in length is associated with the diving bell 14 shown in Fig. 3. A small quantity of mercury 35 is placed in the bottom of the U-shaped receptacle. A predetermined volume of gas having good heat conducting qualities is disposed in the longer leg 31 of the U-shaped member. An electrically heated resistor or lamp filament 33 suitable for heating the gas is sealed into the upper portion of the leg 31 and is supplied with energy through conductors 34. A contact member 36 is sealed into the U-shaped receptacle near the bottom of the U and another contact member 37 is sealed into the receptacle 31 a small distance above the normal level of the mercury. Referring to the modifications shown in Fig. 3, if the liquid level in the diving bell rises above the predetermined level in the leg 31, the heat dissipated by the gas in the leg 31 will materially increase, with the result that the pressure in the longer leg 31 decreases, thereby causing the mercury 35 to rise to the contact member 37, whereby a circuit is completed through conductors 38, between the contact members 36 and 37 and a signal or indicator may be operated in any well known manner.

In the combined Figs. 4 and 4a, this invention is shown in combination with a control system specially designed to operate the starting mechanism 48 for the motor 47 disposed to operate the pump 46, which replenishes the gas in the diving bell. Instead of connecting an indicator or a signalling device between two opposite junction points of the Wheatstone bridge, a relay 50 is connected between the two opposite junction points usually designated the galvanometer circuit of the Wheatstone bridge. The relay 50, when sufficiently energized, energizes the motor starter 48 which thereupon causes the motor 47 to operate the pump 46 to drive air or some other gas through pipe 45 and valve 44 into the diving bell 14.

Obviously, the resistor 19 is not only affected by the liquid level in the diving bell but is also effected by the temperature in the diving bell. Where there is reason to believe that the temperature in the well will not remain constant, a compensating resistor 43 may be disposed in the upper portion of the diving bell. The compensating resistor 43 is connected in the Wheatstone bridge as shown in Fig. 4a.

The use of the compensating resistor is not limited to the modification shown in Figs. 4 and 4a but may also be used with the arrangement shown in Figs. 1 and 2. To make this more apparent, reference should be had to Fig. 5 of the drawings.

Fig. 5a shows an arrangement where no compensating resistor such as 43 is needed. The resistor 19 is disposed longitudinally of the diving bell. If properly calibrated, the pump motor 11 may be controlled by this circuit arrangement regardless of whether the resistor 19 is in the diving bell or outside the diving bell. In the arrangement shown it is assumed that relay 50 controls motor 11, but motor 47 may be controlled as well.

The source of power usually available at oil wells to drive the pumping equipments is of the alternating-current type. When not desirable to use a battery 24 a copper oxide rectifier may be utilized in conjunction with the Wheatstone bridge, or a rectifier may be used to charge the battery 24 from the source of alternating current power.

The resistor 19 need not necessarily be mounted in a fluid tight quartz chamber but may be encased in insulating material and be disposed longitudinally of the diving bell. The heater or resistor 19 may also be mounted outside of the diving bell to cooperate with the liquid level in the well shown at A. When the liquid in the well rises to a predetermined level i. e. to the middle, or upper, portion of resistor 19, Fig. 6, the control system through relay 50 may cause the pump motor 11 to start operating the pump 12 to lower the liquid level in the well until it is at the position shown in the lower part of Fig. 6 at which time the relay 50', through the controlling action of resistor 19', causes the motor 11 to stop.

The controller 48 is of conventional design and per se does not constitute part of this invention. When the liquid level in the well rises to a level such as to change the electrical characteristics of resistor 19, the relay 50 will close and through controller 48 start the motor 11. Similarly, when the electrical characteristics of resistor 19' are changed relay 50' closes and sets up such a circuit in the controller 48 as to stop the motor 11.

Applicant does not wish to be restricted to the specific structural details, arrangement of parts or circuit connections herein set forth, as various modifications thereof may be effected without departing from the spirit and scope of this invention. No other limitations are, therefore, to be imposed on this invention than those indicated in the appended claims.

Applicant claims as his invention:

1. In combination with an electrically driven pump-set using a diving bell for housing the electric driving means for the pump-set, an electrically heated resistor vertically disposed in the diving bell and in heat transfer relation to the medium in the diving bell and means responsive to heat transfer changes between the resistor and the medium for controlling the liquid level in the diving bell.

2. In combination with an electrically driven pump-set using a diving bell for housing the electric driving means for the pump-set, thermoelectric means associated with the diving bell and in heat transfer relation with the medium at the diving bell and means responsive to heat transfer changes between the resistor and the medium for controlling the liquid level in the diving bell.

3. The combination with electric devices housed in a diving bell to protect said devices from the liquid normally surrounding the diving bell, of means for controlling the liquid level in the diving bell and thermoelectric means disposed in said diving bell and responsive to the liquid level in the diving bell for controlling said first named means.

4. In combination with an electrically driven submersible pump-set using a diving bell for protecting the electric driving means from the liquid normally surrounding the diving bell, a control system for said driving means including a Wheatstone bridge arrangement, a source of direct current power connected across two of the junctions of the bridge, a relay connected across the other two junctions of the bridge for controlling the starting and stopping of the electric driving means, three resistors not influenced by temperature changes connected in three of the three branches of the bridge and a fourth resistor responsive to temperature changes and the level of the liquid at the diving bell, connected in the fourth branch of the bridge, said fourth resistor being mounted longitudinally of the pump-set.

5. In combination with a pump-set for wells, means for operating the pump-set, a control system for said operating means including a Wheatstone bridge arrangement, a source of direct current power connected across two of the junctions of the bridge, a relay connected across the other two junctions of the bridge for controlling the starting and stopping of the operating means, three resistors not influenced by temperature changes connected in three of the branches of the bridge and a fourth resistor, influenced by the liquid level and temperature in the well, connected in the fourth branch of the bridge.

6. In combination with an electrically driven submersible pump-set using a diving bell for protecting the electric driving means from the liquid normally surrounding a diving bell, a pump for supplying gas to the interior of the diving bell, an electric motor for driving said pump and a control system for said motor including a Wheatstone bridge arrangement, a source of direct-current power connected across two of the junctions of the bridge, a control relay for controlling the starting and stopping of the motor, a pair of resistors not influenced by temperature changes connected in two adjacent branches of the bridge, a third resistor responsive to temperature changes connected in the third branch of the bridge and vertically disposed in the diving bell to be influenced by the changes in temperature caused by changes of the liquid level in the diving bell and a fourth resistor connected in the fourth branch of the bridge and disposed in the upper portion of the diving bell to compensate for temperature changes of the gas in the diving bell.

7. In combination with a pump-set for wells, operating means for the pump-set, a control system for said operating means including a Wheatstone bridge arrangement, a source of direct-current power connected across two of the junctions of the bridge, a relay connected across the other two junctions of the bridge for controlling the starting and stopping of the operating means, two balanced resistors not influenced by changes in temperature connected in two adjacent branches of the bridge, a third resistor influenced by the liquid level and a temperature in the well connected in the third branch of the bridge and a temperature compensating resistor, influenced by the temperature in the well connected in the fourth branch of the bridge.

EMIL DUHME.